United States Patent [19]

Rizk et al.

[11] Patent Number: 4,719,267

[45] Date of Patent: Jan. 12, 1988

[54] HEAT CURABLE ONE PACKAGE POLYURETHANE RESIN COMPOSITION

[75] Inventors: Sidky Rizk, Westfield; Harry W. S. Hsieh, Edison, both of N.J.

[73] Assignee: Essex Specialty Products, Inc., Sayreville, N.J.

[21] Appl. No.: 893,733

[22] Filed: Aug. 6, 1986

Related U.S. Application Data

[60] Division of Ser. No. 738,898, May 29, 1985, Pat. No. 4,624,996, which is a continuation of Ser. No. 580,886, Feb. 16, 1984, abandoned.

[51] Int. Cl.$^4$ .................... C08F 283/04; C08L 77/00
[52] U.S. Cl. .................... 523/453; 525/424; 525/454; 525/460
[58] Field of Search ............... 525/423, 454, 453, 460, 525/424

[56] References Cited

U.S. PATENT DOCUMENTS

| | | | |
|---|---|---|---|
| 3,375,299 | 3/1968 | Levine | 525/423 |
| 3,639,657 | 2/1972 | Moran et al. | 260/47 EN |
| 3,645,943 | 2/1972 | Krawczyk | 260/22 TN |
| 3,886,228 | 5/1975 | Bolger | 525/423 |
| 4,101,497 | 7/1978 | Charves | 525/453 |
| 4,500,604 | 2/1985 | Herold et al. | 525/423 |
| 4,507,443 | 3/1985 | Barron et al. | 525/453 |

FOREIGN PATENT DOCUMENTS

| 24501 | 3/1981 | European Pat. Off. |
| 1644813 | 1/1971 | Fed. Rep. of Germany |

OTHER PUBLICATIONS

Schwarzer, "The Anchimeric Effect of Various Groups on Epoxide Ring Reactivity", 25th Annual Technical Conference, 1970, Reinforced Plastics/Composites Division, The Society of the Plastics Industry, Inc.

Primary Examiner—John C. Bleutge
Assistant Examiner—A. Carrillo

[57] ABSTRACT

A heat curable one package polyurethane resin composition adaptable to use for automotive seam sealing, particularly under high solids acrylic enamel paints, said composition comprising an isocyanate terminated polyurethane prepolymer having pendant epoxy groups along the polymer chain and the isocyanate groups of which are blocked by reaction with an oxime, and a curing agent having at least two active hydrogen atoms per molecule, such as a polyol, a polyamine, or a blocked polyamine.

10 Claims, No Drawings

HEAT CURABLE ONE PACKAGE POLYURETHANE RESIN COMPOSITION

This application is a division of application Ser. No. 738,898 filed May 29, 1985, now U.S. Pat. No. 4,624,996 granted Nov. 25, 1986, which in turn is a continuation of application Ser. No. 580,886 filed Feb. 16, 1984 and now abandoned.

The present invention relates to heat curable polyurethane resin compositions comprising a polyurethane prepolymer having blocked isocyanate groups and a curing agent, to sealants made from such compositions in combination with one or more fillers, and to methods for using of such sealants.

Polyurethanes have heretofore been used in the art for compounding sealants or adhesives for sealing seams or bonding different substrates. The polyurethanes used were either two package or one pot systems. In addition to the need for sophisticated metering and mixing equipment for the two package systems, the isocyanate containing component must be kept and stored under anhydrous conditions to avoid the reaction of atmospheric moisture with the isocyanate groups, resulting in an unusable product.

A one pot or one package polyurethane system having the advantage of easy handling is highly desirable in the sealant industry, and one pot moisture curable polyurethanes having terminal isocyanate groups have been taught in the art. On exposure to atmospheric moisture, some of the isocyanate groups react with water to form amino groups with the evolution of carbon dioxide. The amino groups further react with other isocyanate groups and lead to a cure of the polymer.

To protect the isocyanate containing polyurethane polymers from moisture, it has been proposed to react the isocyanate groups with a blocking agent having a single active hydrogen group which reacts with an equivalent amount of isocyanate groups. This linkage will be stable at low temperatures but will disassociate at elevated temperatures liberating the isocyanate groups. In the deblocked state at an elevated temperature, this product remains in equilibrium with the blocking agent and is reactive with crosslinking compounds that it comes in contact with.

The temperature at which the blocked isocyanate groups will form and will deblock primarily depends upon the nature of the blocking agent, although other aspects of the curing reaction also depend on the nature of the crosslinker available to react with the deblocked isocyanate groups at deblocking temperatures.

It is the object of the present invention to develop a one package polyurethane system that is stable at room temperature and cures by heating at a moderately elevated temperature. A feature of the present invention is such a system comprising a polyurethane prepolymer having oxime-blocked isocyanate groups together with a curing agent. The polymer system so developed has been compounded into a sealing compound which is of particular utility for filling the seams on auto body assemblies. More in particular, seams filled with such a sealing compound can be painted over with the high solids acrylic enamel paints now widely used in the automotive industry and can be cured at the temperatures used for drying and curing such enamels.

It has been taught in the art and widely described in the literature that phenol and phenol derivatives can be used to block the isocyanate groups of polyurethane prepolymers to eliminate their sensitivity towards reaction with atmospheric moisture. Single package curable polyurethane resin compositions containing a polyisocyanate prepolymer having phenol blocked isocyanate groups are taught in Bolger U.S. Pat. No. 3,886,228, for instance. Blocking reactions between isocyanates and such phenolic compounds require heating the reactants at temperatures ranging from 80° C. to 150° C. Consequently, these blocked polyurethane systems need still higher temperature to deblock and liberate free isocyanate groups available for crosslinking.

According to the present invention, a branched liquid polyurethane prepolymer containing terminal isocyanate groups is reacted with anoxime so that one equivalent of the oxime blocking agent is reacted with one isocyanate equivalent of the polyurethane material. The reaction is conveniently carried out with continuous agitation at room temperature, rather than at an elevated temperature as is required with phenol blockers, until the reaction mixture shows no isocyanate groups present on testing with infrared analysis.

The resulting reaction product is insensitive to atmospheric moisture contamination and is not reactive towards isocyanate-reactive crosslinkers or curing agents at ambient temperatures. Hence, heat curable compositions stable at room temperature can now be compounded by adding a curing agent having at least two active hydrogen groups per molecule to such a blocked product. Finally, sealants can be compounded from such a mixture by adding conventional fillers and other additives to achieve desirable flow properties and thixotropy.

Such heat curable compositions and sealants can be cured by heating at temperatures as low as 250° F. for about 30 minutes, or at higher temperatures for shorter times, because of the deblocking properties of the oxime-blocked isocyanate prepolymer. "Curing" in the present specification and claims refers to the development of a Shore "A" hardness of at least 60-65 at the times and temperatures indicated.

It is a further object of the present invention to develop sealants comprising such blocked polyurethane prepolymers wherein the polymers are branched so that when they are deblocked by heat they react with the available curing agent to form a crosslinked thermoset polyurethane network. Such curing agents can be polyols, polyamines, or polyamines blocked by reaction with an anhydride. Such blocked polyamine products have been widely used as latent hardeners for epoxy resins. The preparation and use of such blocked polyamines is disclosed in U.S. Pat. No. 3,639,657 to Moran et al.

The use of such a blocked amine curing agent permits the incorporation of an epoxy resin into the resin or sealant composition without affecting the shelf stability of the epoxy resin. On heating such a mixture of blocked polyurethane, epoxy, and blocked amine, the deblocked amine reacts simultaneously with the deblocked isocyanate groups as well as with the available epoxy resin to form an interpenetrating polyurethane-epoxy copolymer of a kind discussed by Frisch et al. in Modern Plastics, May, 1977, p. 84.

The isocyanate terminated polyurethane polymers of the invention are prepared by the reaction of an organic polyisocyanate with a polyhydroxy compound. If part or all of the polyhydroxy compound has an hydroxy functionality of more than two hydroxy groups per molecule, the polyurethane reaction product is not linear but branched. When later crosslinked, such a branched polymer develops a thermoset polyurethane (elastomeric) character.

In this reaction, the polyisocyanate is employed in excess so that the resultant polymers have isocyanate terminals.

The polyols that may be used are the same as those commonly employed in the prior art for preparing polyurethane resins, e.g. polyester polyols and, particularly, polyether polyols. The polyester polyols include lactone polyols prepared by the polymerization of lactones, compounds such as castor oil, and polyester polyols formed by the reaction of an alkylene glycol with a dicarboxylic acid, for example. Polyether polyols may be prepared by forming alkylene oxide adducts of the polyester polyols and lactone polyols discussed above, or by the reaction of alkylene oxides with materials such as castor oil. However, the preferred polyether polyols are polyoxyalkylene polyols, e.g. polyoxalkylene diols prepared, for example, by the homopolymerization or copolymerization of materials such as ethylene oxide and propylene oxide. Polyoxyalkylene triols, for example linear compounds having pendant hydroxy groups or having branched polyether chains, may also be employed as starting compounds in admixture with diols.

Further suitable polyols are polyhydroxy polysulfide polymers of the formula

HO-X-SS(Y-SS)$_n$-X-OH, wherein X and Y are each divalent aliphatic groups and n has a value between 1 and 100.

In one embodiment according to the present invention, some of the polyol compound or mixture of polyols may be replaced with water. The water, on reaction with isocyanate, releases carbon dioxide and forms an amino group. The latter in turn reacts with further isocyanate groups to form urea groups. In this embodiment, up to 25 percent of the equivalents of isocyanate-reactive OH groups contributed by the polyol may be replaced by an equal number of equivalents of water. Preferably, the polyol employed in this embodiment is an aliphatic polyol such as a polyoxyalkylene polyol.

Another embodiment according to the present invention involves the replacement of some of the polyol compound with a polyol containing diglycidyl ether groups. It has been reported in the literature, e.g. the 25th Annual Technical Conference, 1970, Reinforced Plastics/Composites Division, The Society of Plastics Industry Inc., Sec. 3-A, Page 1, by C. G. Schwarzer, that the reactivity of the diglycidyl ether of bisphenol A may be increased tenfold by placing a methylol group in the ortho position adjacent to the glycidyl ether group. An example of such compound is dimethylol derivative of Bisphenol A diglycidyl ether group of the formula.

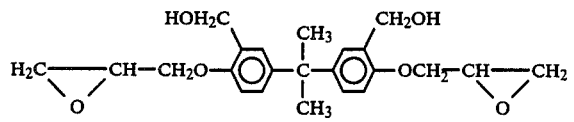

The incorporation of such a polyol into the urethane chain will yield a urethane chain having pendant epoxy groups which can be crosslinked later with a blocked amine curative. Such a crosslinked system will comprise a urethane-epoxy copolymer with the toughness and abrasion resistance properties of polyurethane elastomers coupled with the properties of rigidity and strength of crosslinked polyepoxides and their heat, electrical, and chemical resistance.

The organic polyisocyantes which are reacted in excess with such polyols for formation of the isocyanate-terminated polyurethane prepolymers of the present invention are those taught, for example, in Brode et al. U.S. Pat. No. 3,632,577. That is, they are aliphatic, cycloaliphatic, araliphatic, or aromatic polyisocyanates, suitably di- and/or tri-isocyanates. Particularly preferred materials for use according to the present invention are diphenylmethane-4,4'-diisocyanate having aromatic characteristics, the cycloaliphatic diisocyanate 3-isocyanatomethyl-3,5,5-trimethylcyclohexyl isocyanate (isophorone diisocyanate), and dicyclohexyl-4,4'-methane diisocyanate. Mixtures of two or more of these preferred materials are also preferred for use in the present invention.

As known in the art, the polyols and polyisocyanates are suitably reacted at a temperature between 0° C. and 120° C., preferably between 25° C. and 90° C. The reactions are carried out under an inert atmosphere such as a nitrogen blanket and under anhydrous conditions. The reaction may suitably be carried out in the presence of a catalyst. The stannous salts of carboxylic acid, such as stannous octoate, stannous oleate, stannous acetate and stannous laurate are known as catalysts for the formation of urethanes. Also, dialkyltin dicarboxylates such as dibutyltin dilaurate and dibutyltin diacetate are known in the art as urethane catalysts, as are tertiary amines with tin mercaptides. The amount of catalyst employed is generally between 0.005 and 5% by weight of the mixture catalyzed, depending on the nature of the isocyanate.

The polyols employed in this reaction, having two or more hydroxyl groups, generally have a molecular weight between about 500 and 6000 and have hydroxy equivalent weights between 50 and 2000. The preferred polyoxyalkylene polyols, such as polyoxypropylene, have hydroxy equivalent weights between 200 and 2000. These materials are reacted with excess isocyanate until the isocyanate content in the prepolymer is close to the theoretical value, as determined by titrating the free isocyanate groups in a sample of the prepolymer with dibutylamine. The resulting prepolymers having terminal isocyanate groups have molecular weights between about 3000 and about 10000. The preferred prepolymers have a molecular weight between about 3000 and 6000 and have a moderate viscosity which facilitates their further reaction with an oxime blocking agent to produce the polymer mixtures of zero isocyanate content according to the present invention.

The oxime blocking agents for the free isocyanate groups contain an active hydrogen atom which react with the isocyanate groups at room temperature in an equilibrium reaction which can be represented as

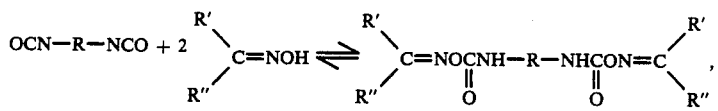

where R is a polyurethane chain and R' and R" taken alone are hydrogen, aliphatic or aromatic groups, or, taken together with the carbon atom to which they are attached, are part of 5- or 6-membered aliphatic or aromatic ring.

At moderately elevated temperatures the reaction proceeds from right to left generating free isocyanate groups which react with the curing agent present in the system.

Oximes useful as blocking agents according to the invention include acetophenone oxime,

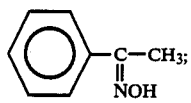

acetone oxime,

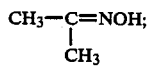

methyl ethyl ketoxime,

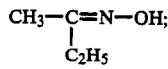

and cyclohexanone oxime,

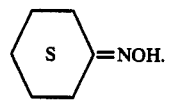

Other oximes which can be used as blocking agents are propyl aldehyde oxime, formaldoxime, butyl aldehyde oxime, cyclopentanone oxime, benzophenone oxime, and methyl isobutyl ketone oxime.

Methyl ethyl ketoxime and cyclohexanone oxime are preferred for use in the present invention because of the low deblocking temperature of the blocked compound formed with these oximes.

In the heat curable compositions and sealants of the present invention, such blocked polyurethane prepolymers are combined with an amount of a crosslinking agent such that there are substantially equivalent numbers of (blocked) isocyanate groups and active (but possibly blocked) hydrogen atoms present in the mixtures.

The polyol curing agents which can be used as crosslinkers for the isocyanates when deblocked by heat are the same kinds of compounds as are used to manufacture the polyurethane prepolymer. These include polyester polyols and polyether polyols like those already disclosed earlier herein as useful for the synthesis of the isocyanate terminated polyurethane prepolymer.

The polyamine crosslinking agents which are mixed with the blocked prepolymer can be a polyamine or mixture of polyamines having the active amino hydrogen atoms needed to crosslink the isocyanate groups after the latter are deblocked by heat. Examples of such polyamines are 4,4'-methylene bis(orthochloroaniline), methylene dianiline, methylene bis-2-methoxyaniline, 2,3,5-trichloro-4,4'-methylene dianiline, o-phenylenediamine, m-phenylene diamine, p-phenylene diamine, 2,6-dichloro-p-phenylene diamine, tolylene-2,4-diamine, tolidine, dianisidine, diphenylether-4,4'-diamine, 4,4'-diphenyl diamino sulfone, 3,3'-diphenyl diamino sulfone, naphthalene-1,5-diamine, 2,4-diamino cumene, m-tolylene diamine, p-chloro-phenylene diamine, o-chloro-p-phenylene diamine, m-xylylendiamine, 2,4-bis(p-aminobenzyl)aniline, and aromatic diamines represented by the formula

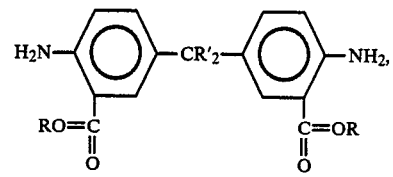

wherein R is —CH$_3$, —C$_2$H$_5$, —C$_3$H$_9$, —C$_6$H$_{13}$, —C$_8$H$_{17}$, —CH(CH$_3$)—(CH$_2$)$_3$—CH$_3$, or —CH$_2$—CH(CH$_3$)$_2$ and R' is —H, —CH$_3$, —C$_4$H$_9$ or —C$_6$H$_{13}$. Other suitable amines are the aromatic diamines represented by the formula:

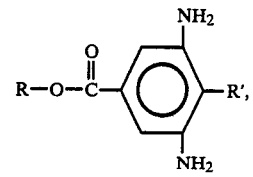

wherein R is —CH$_3$, —C$_2$H$_5$, —C$_3$H$_7$, —nC$_4$H$_9$, —iC$_4$H$_9$, —(CH$_2$)$_2$OCH$_3$, —CH$_2$CH(CH$_3$)$_2$, —C$_{18}$H$_{37}$, or —CH$_2$—CH(C$_2$H$_5$)—(CH$_2$)$_3$—CH$_3$ and R' is —CH$_3$, —C$_2$H$_5$, —C$_3$H$_7$, or —iC$_4$H$_9$. Other suitable amines are aliphatic polyamines such as hydrazine, ethylene diamine, trimethylene tetramine, diethylene triamine, hexamethylene-1,6-diamine, and propylene diamine, and cycloaliphatic polyamines such as 1,3-bis(aminoethyl)cyclohexane, bis(p-aminocyclohexyl)methane, and 3-aminomethyl-3,5,5,-trimethylcyclohexyl amine (isophorone diamine).

A further group of amine curing agents are the blocked polyamines obtained by the reaction of approximately equimolecular amounts of an anhydride selected from the group consisting of phthalic anhydride, hexahydrophthalic anhydride, tetrahydrophthalic anhydride, methyltetrahydrophthalic anhydride, polyazelaic anhydride, succinic anhydride, and dodecenylsuccinic anhydride with a polyamine selected from the group consisting of ethylene diamine, diethylene triamine, triethylene tetramine, 1,3-diaminopropane, 1,6-diaminohexane, imino bis(propylamine) and methyl imino bis(propylamine) at a temperature from about 50° C. to about 160° C. in a non-aqueous medium as described in Moran et al. U.S. Pat. No. 3,639,657.

The blocked polyamine curing agent preferred for use in the present invention is the reaction product of phthalic anhydride and diethylene triamine.

For formulating seam sealant compositions, the mixtures of polymer and curing agent of the invention are combined with fillers and additives known in the prior art for use in elastomeric compositions. By the addition of such materials, physical properties such as viscosity, flow rate, sag, and the like can be modified. However, to prevent premature reaction of the moisture sensitive isocyanate groups of the polymer after deblocking, the filler used should not contain an excessive amount of moisture. Exemplary filler materials and additives include materials such as carbon black, titanium dioxide, clays, calcium carbonate, surface treated silicas, ultraviolet stabilizers, antioxidants, and the like. This list, however, is not comprehensive and is given merely as illustrative.

A better understanding of the present invention and of its many advantages will be had by referring to the following specific examples, given by way of illustration.

EXAMPLE 1

A ketoxime blocked branched polyether urethane prepolymer was synthesized by blending 642.3 g (1.23 eq.) of a polyoxypropylene diol commercially available under the tradename "Pluracol P-1010" (average molecular weight about 1,050), 328.3 g (2.63 eq.) of 4,4'-diphenyl methane diisocyanate, and 0.04 g of dibutyltin dilaurate as a catalyst in a reaction vessel. The mixed ingredients were heated at 75° C. for three hours. Then a mixture of 278.3 g of diisodecylphthalate and 50.3 g (0.35 eq.) of a polyoxypropylene triol commercially available under the tradename "Pluracol TP-440" (average molecular weight about 425) were added to the reaction vessel. The whole mixture was brought to 55° C. and reacted for 45 minutes. At this point, the isocyanate content of this reaction mixture was determined to be 3.4% by weight.

Finally, 92.3 g (1.06 eq.) of methyl ethyl ketoxime were introduced and mixing was continued without heating for about 30 minutes until NCO could not be detected by infrared analysis. The prepolymer was emptied into a metal container, degassed, flushed with nitrogen, and stored.

EXAMPLE 2

An epoxy containing polyether urethane prepolymer blocked with a ketoxime was prepared by thoroughly mixing 196.6 g (0.375 eq.) of polyether diol of Example 1, 30.4 g (0.042 eq.) of a diglycidylether containing methylol groups commercially available under the tradename "Apogen 107" (weight per epoxide group=190–205; hydroxy equivalent weight=710), 105.0 g (0.83 eq.) of 4,4'-diphenylmethane diisocyanate, 66.0 g of butyrolactone, and 0.02 g of dibutytin dilaurate and heating at 50° C. until the NCO content reached 4.1% by weight.

After the mixture had cooled to room temperature, 37.2 g (0.43 eq.) of methylethyl ketoxime were added and stirring was continued without heating for 30 minutes until isocyanate groups could no longer be detected by infrared analysis. The prepolymer was placed in a metal can, degassed, flushed with nitrogen, and stored for further compounding.

EXAMPLE 3

A ketoxime blocked branched polyether urethane prepolymer was synthesized by blending 642.3 g (1.23 eq.) of the polyether polyol mentioned in Example 1, 126.5 g of butyrolactone, 0.06 g of dibutyltin dilaurate, and 349.8 g (2.63 eq.) of a polymeric 4,4'-diphenylmethane diisocyanate commercially available under the tradename "PAPI-901" (NCO equivalent weight=133) in a reaction vessel and then heating at 75° C. for three hours. 50.3 g (0.35 eq.) of the polyether triol "Pluracol TP-440" also mentioned in Example 1 were added and the resulting mixture was reacted at 55° C. for three hours. The isocyanate content at this point was determined to be 3.6% by weight.

After cooling to room temperature, a mixture of 95.7 g (1.1 eq.) of methyl ethyl ketoxime and 158.1 g of butyrolactone was introduced into the reaction vessel and stirring was continued at room temperature for 30 minutes until no isocyanate groups could be detected by infrared analysis. The resulting ketoxime blocked polyurethane prepolymer was kept in a metal container under anhydrous conditions.

EXAMPLE 4

An epoxy containing polyether urethane prepolymer blocked with a ketoxime was synthesized by combining 943.7 g (1.80 eq.) of the polyetherdiol mentioned in Example 1, 70.4 g (0.1 eq.) of the epoxy compound used in Example 2, and 431.4 g of butyrolactone with 0.1 g of dibutyltin dilaurate as a catalyst and 530.4 g (3.9 eq.) of a polymeric 4,4'-diphenyl-methane diisocyanate commercially available under the tradename "PAPI-901" (NCO equivalent weight=133) and then heating the mixture at 50° C. for one hour. At this stage, the NCO content of the mixture in the reaction vessel was found to be 3.8% by weight.

178.4 g (2.05 eq.) of methylethyl ketoxime were then added to the reaction mixture after cooling to room temperature. Stirring was continued for 30 minutes at room temperature until no isocyanate groups could be detected by infrared analysis. The blocked polyurethane prepolymer was stored in a metal can under anhydrous conditions.

EXAMPLE 5

An epoxy containing polyether urethane prepolymer blocked with a ketoxime was prepared by mixing 1796.8 g (1.8 eq.) of a polyoxypropylene diol commercially available under the tradename "Pluracol P-2010" (average molecular weight about 2,000), 140.8 g (0.02 eq.) of the epoxy compound mentioned in Example 2, 662.0 g of butyrolactone, 532.0 g (4.0 eq.) of the polymeric diisocyanate described in Example 3, and 0.14 g of dibutyltin dilaurate as a catalyst.

The mixed ingredients were heated at 50° C. for 1 hour, cooled to room temperature, and then blocked with 178.4 g (2.05 eq.) of methylethyl ketoxime by simply mixing at room temperature for 30 minutes until isocyanate could no longer be detected by infrared analysis. This blocked prepolymer was filled into a metal can, degassed, flushed with nitrogen, and sealed.

EXAMPLE 6

A ketoxime blocked branched polyether urethane prepolymer was synthesized by mixing thoroughly in a reaction vessel 1000.0 g (1.0 eq.) of the polyoxypropylenediol mentioned in Example 5, 194.4 g of butyrolactone, 369.7 g (2.78 eq.) of the polymeric diisocyanate also mentioned in Example 5, and 0.08 g of dibutyltin dilaurate as a catalyst and heating at 75° C. for 3 hours. The NCO content of the reacted mixture was determined to be 4.8% by weight. Then 64.7 g (0.45 eq.) of the polyoxypropylene triol of Example 1 ("Pluracol TP-440") were introduced into the reaction vessel and the whole mixture was reacted at 55° C. for 2 hours until the isocyanate content of this reaction mixture was 3.4% by weight.

The mixture was cooled to room temperature and the product was then blocked by adding a mixture of 194.4 g of butyrolactone and 120.9 g (1.39 eq.) of methyl ethyl ketoxime and stirring at room temperature. This prepolymer was transferred into a metal container, degassed, flushed with nitrogen, and stored for further compounding.

EXAMPLE 7

106.9 g (0.85 eq.) of diphenylmethane 4,4'-diisocyanate, preheated to a temperature of about 49° C., were introduced into a jacketed reactor under nitrogen. 415.7 g (0.42 eq.) of a polyoxypropylene ether diol (average molecular weight about 2,000) were added. The mixture was heated to about 82° C. until it was substantially free of hydroxy groups but contained about 3.5 percent by weight of unreacted isocyanate groups, based on the total weight of the reaction product. The mixture was then cooled to 49° C. and 189.9 g (0.13 eq.) of a polyoxypropylene ether triol (average molecular weight about 4,400) were added. Also, 285.0 g of an alkylnaphthalene plasticizer, commercially available under the tradename "Kenplast G", were also added. Finally 0.06 g of stannous octoate as a catalyst was admixed.

The temperature of the mixture was brought to 60° C. and the mixture was reacted until the free isocyanate content of the resulting material was 1.5 percent by weight. The reaction time is generally about 2-3 hours. The prepolymer was then emptied into a metal container, degassed, flushed with nitrogen, and stored.

EXAMPLES 8-9

400.0 g (0.15 eq.) samples of the prepolymer of Example 7 were respectively reacted with 13.7 g (0.157 eq.) of methyl ethyl ketoxime at room temperature for 30 minutes (Example 8), and with 17.7 g (0.157 eq.) of cyclohexanonoxime at room temperature for 2.5 hours (Example 9). The blocked prepolymers were examined by infrared analysis to make sure that all isocyanate was fully reacted with the blocking agents.

EXAMPLE 10

22.5 g of an alkylnaphthalene plasticizer, commercially available under the tradename "Kenplast G", 427.4 g of a dialkyl phthalate with mixed $C_7$, $C_9$, and $C_{11}$ linear alkyl groups, and 1125.6 g (0.56 eq.) of polyoxypropylene ether triol (average molecular weight about 6,000) were mixed and heated to 50° C. in a reaction vessel. 190.4 g (1.4 eq.) of a liquid 4,4' diphenyl methane diisocyanate (NCO equivalent weight=135.6) and 0.12 g of dibutyl tin dilaurate were added and the mixture was stirred. When the temperature of the mixture reached 60° C., 33.7 g of diethyl malonate were introduced. The well mixed mixture was then cooled to room temperature.

Finally, the cooled reaction mixture was blocked with 78.3 g (0.9 eq.) of methyl ethyl ketoxime at room temperature for 30 minutes until no isocyanate groups could be detected by infrared analysis. This reaction product was packed in a metal container under anhydrous conditions.

EXAMPLE 11

A polyether urethane containing epoxy was prepared by reacting 874.3 g (1.71 eq.) of a polyoxypropylene ether diol (average molecular weight about 1,000), 68 g (0.095 eq.) of diglycidyl ether containing methylol groups commercially available under the tradename "Apogen 107" (weight per epoxide=190–205; hydroxy equivalent weight=710), and 435.7 g of a dialkyl phthalate plasticizer containing mixed $C_7$, $C_9$, and $C_{11}$ linear alkyl groups with 365.1 g (2.67 eq.) of a liquid polymeric 4,4'-diphenyl methane diisocyanate (NCO eq. wt. about 136.9) commercially available under the tradename "PAPI-901" at 50° C. for 3 hours. The NCO content dropped to 2.1% by weight.

This reaction mixture was cooled to room temperature and combined with 101.9 g (0.90 eq.) of cyclohexaneoxime without heating. Stirring was continued for 3 hours until no isocyanate groups could be detected by infrared analysis. The reaction product was placed in a metal can under anhydrous conditions.

EXAMPLE 12

A ketoxime blocked polyurethane prepolymer having a polyester structure was synthesized by mixing thoroughly 315.0 g (0.32 equivalent) of a polyester diol preheated to 45° C., 88.2 g (0.70 equivalent) of molten diphenylmethane-4,4'-diisocyanate, and 0.02 g of stannous octoate as a catalyst in a reactor. (The polyester diol is a condensation product of ethylene glycol with a mixture of glutaric, adipic, and succinic acids, has an average molecular weight of about 2,000 and is commercially available under the tradename "Polyesterol EG 2000".) The temperature of the mixture was brought to 75° C. and reacted for 2–3 hours until the free isocyanate content of the resulting materials was 3.9% by weight.

Then 34.7 g (0.40 eq.) of methylethyl ketoxime were added and mixing was continued with heating (to maintain a low viscosity condition) for 30 minutes until no isocyanate group could be detected by infrared analysis. The prepolymer was stored under anhydrous conditions.

EXAMPLE 13

A ketoxime blocked branched polyether urethane prepolymer was prepared by thoroughly mixing 77.2 g (0.076 eq.) of the "Pluracol 2010" polyoxypropylene ether diol mentioned in Example 5, 115.2 g (0.076 eq.) of a polyoxypropylene ether triol (average molecular weight about 4,400), 3.8 g of an alkylnaphthalene plasticizer, commercially available under the tradename "Kenplast G", and 72.2 g of a dialkyl phthalate plasticizer containing mixed $C_7$, $C_9$ and $C_{11}$ linear alkyl groups in a reactor and heating the mixture to about 45° C. 42.9 g (0.34 eq.) of molten diphenyl methane-4,4'-diisocyanate and 0.04 g of stannous octoate were introduced. The whole mixture was reacted at 75° C. for three hours (NCO %=2.56), cooled to room temperature, and combined with 17.3 g (0.2 eq.) of methyl ethyl ketoxime. Stirring was continued for 30 minutes without heating until no isocyanate groups could be detected by infrared analysis. The blocked prepolymer was stored in a metal can under anhydrous conditions.

EXAMPLE 14

A ketoxime blocked branched polyether prepolymer was prepared by thoroughly mixing 273.8 (0.532 eq.) of the polyoxypropylene ether diol described in Example 1, 811.0 g (0.532 eq.) of a polyoxypropylene ether triol (average molecular weight about 4,400), and 573.7 g of 2-ethylhexyl-diphenyl phosphate plasticizer in a reactor and heating the batch to about 45° C. 268.4 g (2.13 eq.) of molten diphenyl methane-4,4'-diisocyanate and 0.07 g of stannous octoate were then introduced. The whole mixture was reacted at 75° C. for 3 hours (at this point, NCO %=2.32). 161.5 g (1.19 eq.) of a liquid polymethylene polyphenyl isocyanate (average NCO equivalent weight=135.5) and then 200.5 g (2.26 eq.) of methyl ethyl ketoxime were added to this mixture. Mixing was continued for 30 minutes with cooling until no isocyanate could be detected by infrared analysis. This blocked prepolymer was finally stored in a metal container under anhydrous condition.

EXAMPLE 15

50.0 g of the blocked prepolymer of Example 1 were mixed with 2.8 g of bis(p-aminocyclohexyl)methane and 0.02 g of an antifoaming agent. The mixture could be cured at 250° F. in 30 minutes to form a smooth film.

EXAMPLE 16

100.0 g of the prepolymer of Example 4 were mixed with 19.2 g of diocytyl phthalate, 0.04 g of an antifoaming agent, and 11.6 g of a diethylene triamine-phthalic anhydride adduct (a blocked amine hereinafter indentified as "Hardener A") as described in Example 1 of U.S. Pat. No. 3,488,742. The degassed mixture could be cured at 250° F. in 30 minutes into a smooth film.

EXAMPLE 17

A one package mixture was prepared by blending 100.0 g of the blocked prepolymer of Example 2, 35.6 g of dioctyl phthalate, and 42.0 g of a 41/59 mixture of "Hardener A" with a liquid epichlorohydrin bisphenol epoxy resin (weight per epoxide=185–196). (This mixture will hereinafter be identified as "Hardener B".) The mixture was degassed and applied to a piece of "Bonderite 40" steel plate. Under curing conditions of 250° F. for 30 minutes, a tack-free film was obtained with good adhesion to the "Bonderite 40" substrate. This mixture was stable after aging at 130° F. for 3 days.

EXAMPLE 18

A one package mixture was prepared by blending 100.0 g of the blocked prepolymer of Example 3, 26.4 g of dioctyl phthalate, and 28.4 g of blocked amine "Hardener A". The degassed mixture gave a tack-free film after baking at 250° F. for 30 minutes, which film adhered to a "Bonderite 40" substrate. The liquid mixture remained stable after aging at 130° F. for 3 days.

EXAMPLE 19

Another one package mixture was prepared by mixing 100.0 g of the blocked epoxy containing polyether urethane prepolymer of Example 5, 26.2 g of dioctyl phthalate, 27.8 g of blocked amine "Hardener A" and 0.04 g of antifoaming agent. The degassed mixture gave a tack-free film on baking at 250° F. for 30 minutes.

EXAMPLE 20

A blocked polyether urethane prepolymer is crosslinked with a molecule of hydroxy functionality more than two by mixing 100.0 g of the prepolymer of Example 6, 16.4 g of dioctyl phthalate, 0.08 g of an antifoaming agent, 0.4 g of dibutyltin dilaurate, and 5.0 g of N,N,N,',N'-tetrakis(2-hydroxy propyl)ethylenediamine (hydroxyl equivalent weight=73.0). On baking at 250° F. for 30 minutes, the degassed mixture produced a smooth tack-free film. This mixture survived thermal aging at 130° F. for 3 days.

EXAMPLE 21

100.0 g of the prepolymer of Example 8, 15.8 g of a dialkyl phthalate plasticizer, 0.04 g of an antifoaming agent, and 3.0 g of isophorone diamine (average molecular weight=170.0) were combined. The clear mixture could be cured into a smooth film for baking at 250° F. for 30 minutes.

EXAMPLE 22

100.0 g of the cyclohexane oxime blocked polyether urethane prepolymer of Example 9 were mixed with 2.2 g of m-xylene diamine. The clear mixture could be cured at 250° F. in 30 minutes. It also passed the thermal stability test, i.e. aging at 130° F. for 3 days.

EXAMPLE 23

100.0 g of the blocked prepolymer of Example 10 were mixed with 19.4 g of the blocked amine/epoxy mixture of Example 17 ("Hardener B") along with 0.04 g of an antifoaming agent. The clear mixture survived aging at 130° F. for 3 days and cured at 250° F. in 30 minutes giving a tack-free film.

EXAMPLE 24

A sealant was compounded by mixing 100.0 g of the blocked prepolymer of Example 11 with 20.0 g of the "Hardener B" mixture, 20.0 g of a dialkyl phthalate plasticizer (linear alkyl=$C_7$, $C_9$ and $C_{11}$), 4.5 g of molecular sieve powder, 98.5 g of dried clay, and 0.2 g of an antifoaming agent. This mixture could be cured at 250° F. in 30 minutes to give a sealant of 75–80 Shore A hardness.

EXAMPLE 25

A one component mixture was prepared by mixing 50.0 g of the methyl ethyl ketoxime blocked prepolymer of Example 12 with 5.3 g of 2,4-bis(p-aminobenzyl)aniline and 0.04 g of an antifoaming agent. The mixture could be cured at 250° F. in 30 minutes.

EXAMPLES 26 AND 27

Two polyether polyols were used as curing agents for the methylethyl ketoxime blocked prepolymer of Example 13. They are, respectively, a polyether polyol having a molecular weight of 590 and an hydroxy functionality of 5.0, commercially available under the tradename "Niax Polyether Polyol LA-475" and a polyether polyol having a molecular weight of 750 and an hydroxy functionality of 5.3, commercially available under the tradename "Niax Polyether Polyol BDE-400". 100.0 g of the prepolymer in Example 13 were mixed with 5.9 g of "Niax Polyether Polyol LA-475" (Example 26) or with 7.1 g of "Niax Polyether Polyol BDE-400" (Example 27) in combination with 100.0 g of dried clay and 10.8 g of dimethyltin dilaurate catalyst.

Each mixture could be cured completely at 250° F. in 30 minutes and passed the storage stability test on aging at 130° F. for 3 days.

EXAMPLE 28

100.0 g of the prepolymer of Example 13 were blended with 100.0 g of dried clay, 10.8 g of dimethyltin dialaurate, and 9.8 g of an adduct prepared from three moles of diphenyl methane-4,4'-diisocyanate and seven moles of a polycaprolactone triol of molecular weight 300, commercially available under the tradename "Niax Polyol PCP-301". The mixture could be cured at 250° F. in 30 minutes and was stable at 130° F. for more than 3 days.

What is claimed is:

1. A one-package, solventless heat curable polyurethane resin composition consisting essentially of
   (1) an isocyanate terminated polyurethane prepolymer having pendant epoxy groups along the polymer chain and prepared by reacting an excess of a polyisocyanate with a mixture of a polyol and a di-o-methylol derivative of Bisphenol A diglycidyl ether, the isocyanate groups of which prepolymer are blocked by reaction with an oxime; and
   (2) a curing agent having at least two active hydrogen atoms per molecule.

2. A composition as in claim 1 wherein said polyol is a polyether polyol.

3. A composition as in claim 2 wherein said polyether polyol is a polyether diol.

4. A composition as in claim 3 wherein said polyether diol is a polyoxyalkylene diol.

5. A composition as in claim 1 wherein said oxime is cyclohexanone oxime.

6. A composition as claimed in claim 1 wherein said curing agent is an amine.

7. A composition as in claim 1 wherein said curing agent is polyamide condensation product obtained by reacting approximately equimolecular amounts of an amine selected from the group consisting of diethylene triamine and triethylene tetramine with an anhydride selected from the group consisting of phthalic anhydride, hexahydrophthalic anhydride, maleic anhydride, and succinic anhydride.

8. A composition as in claim 7 wherein said amine is diethylene triamine and said anhydride is phthalic anhydride.

9. A composition as in claim 1 wherein said curing agent is a polyol.

10. A heat curable sealant comprising a composition as in claim 1 in combination with at least one filler suitable for use in elastomeric compositions.

* * * * *